United States Patent
Loss et al.

(10) Patent No.: US 7,781,754 B2
(45) Date of Patent: Aug. 24, 2010

(54) FERMIONIC BELL-STATE ANALYZER AND QUANTUM COMPUTER USING SAME

(75) Inventors: Daniel Loss, Basel (CH); Hans-Andreas Engel, Binningen (CH)

(73) Assignee: MagiQ Technologies, Inc., New York, NY (US)

( * ) Notice: Subject to any disclaimer, the term of this patent is extended or adjusted under 35 U.S.C. 154(b) by 413 days.

(21) Appl. No.: 11/825,808

(22) Filed: Jul. 9, 2007

(65) Prior Publication Data

US 2008/0142787 A1    Jun. 19, 2008

Related U.S. Application Data

(60) Provisional application No. 60/831,530, filed on Jul. 18, 2006.

(51) Int. Cl.
*H01L 29/06* (2006.01)

(52) U.S. Cl. ............ 257/9; 257/E29.076; 257/E29.168; 257/E49.003; 257/E21.089

(58) Field of Classification Search ............... 257/9, 257/E29.076, E29.168, E49.003, E21.089
See application file for complete search history.

(56) References Cited

FOREIGN PATENT DOCUMENTS

WO    WO2005015489    2/2005

OTHER PUBLICATIONS

Ono et al. "Spin selective tunneling and blocakde in two-electron double quantum dot," phys. stat. sol. (b) 238, 335 (2003).*

Rammer et al. "Quantum measurement in charge representation," Phys. Rev. B. 70 115327-1, (2004).*

Petta et al, "Coherent Manipulation of Coupled Electron Spins in Semiconductor Quantum Dots", Science, vol. 309, pp. 2180-2184, 2005.

Engel et al, "Fermionic Bell-State Analyzer for Spin Qubits", Science, vol. 309, pp. 586-588, 2005.

Engel et al, "Fermionic Bell-State Analyzer for Spin Qubits", Science, vol. 309, pp. 586-588, 2005, Supporting Online Material www.sciencemag.org/cgi/contentfull/309/5734/586/.

Friesen et al, "Spin Readout and Initialization in a Semiconductor Quantum Dot", Phys.Rev.Lett., vol. 92, No. 3, pp. 037901-1-4.

(Continued)

*Primary Examiner*—Davienne Monbleau
*Assistant Examiner*—Matthews Reames
(74) *Attorney, Agent, or Firm*—Opticus IP Law PLLC

(57) ABSTRACT

The Bell-state analyzer includes a semiconductor device having quantum dots formed therein and adapted to support Fermions in a spin-up and/or spin-down states. Different Zeeman splittings in one or more of the quantum dots allows resonant quantum tunneling only for antiparallel spin states. This converts spin parity into charge information via a projective measurement. The measurement of spin parity allows for the determination of part of the states of the Fermions, which provides the states of the qubits, while keeping the undetermined part of the state coherent. The ability to know the parity of qubit states allows for logic operations to be performed on the qubits, i.e., allows for the formation of (two-qubit) quantum gates, which like classical logic gates, are the building blocks of a quantum computer. Quantum computers that perform a parity gate and a CNOT gate using the Bell-state analyzer of the invention are disclosed.

13 Claims, 10 Drawing Sheets

OTHER PUBLICATIONS

Pazy et al, "Spin State Readout by Quantum Jump Technique: For the Purpose of Quantum Computing", IEEE Transactions on Nanotechnology, vol. 3, No. 1, pp. 10-16, 2004.

Elzerman et al, "Tunable few-electron double quantum dots with integrated charge read-out", Physica E, vol. 25, pp. 135-141, 2004.

Engel et al, "Measurement Efficiency and n-Shot Readout of Spin Qubits", Phys.Rev.Lett., vol. 93, No. 10, pp. 106804-1-4.

Engel et al, "Controlling Spin Qubits in Quantum Dots", pp. 1-18. 2004, http://arxiv.org/PS_cache/cond-mat/pdf/0409/0409294v1.pdf.

Wiel et al, "Electron transport through double quantum dots", Rev. Mod. Phys., vol. 75, pp. 1-22, 2003.

Engel et al, "Single-Spin dynamics and decoherence in a quantum dot via charge transport", Phys.Rev.B, vol. 65, pp. 195321-1-19.

Bühler et al, "Nanoscale single-electron transistor architectures for single spin detection in solid-state quantum computer devices", Proceedings of SPIE, vol. 4590, pp. 329-336, 2001.

Recher et al, "Quantum Dot as Spin Filter and Spin Memory", Phys. Rev.Lett., vol. 85, No. 9, pp. 1962-1965, 2000.

* cited by examiner

| $p_1$ | $p_2$ | m | "c" | "t" |
|---|---|---|---|---|
| 0 | 0 | 0 | — | — |
| 0 | 0 | 1 | — | X |
| 0 | 1 | 0 | Z | — |
| 0 | 1 | 1 | Z | X |
| 1 | 0 | 0 | — | X |
| 1 | 0 | 1 | — | — |
| 1 | 1 | 0 | Z | X |
| 1 | 1 | 1 | Z | — |

FIG. 10

FERMIONIC BELL-STATE ANALYZER AND QUANTUM COMPUTER USING SAME

CLAIM OF PRIORITY

This invention claims priority under 35 USC 119(e) from U.S. Provisional Patent Application Ser. No. 60/831,530, filed on Jul. 18, 2006, which application is incorporated by reference herein.

STATEMENT OF GOVERNMENTAL SUPPORT

This invention was made with support from Defense Advanced Research Projects Agency (DARPA) grant no. DAAD19-01-1-0659 and the National Science Foundation (NSF) grant no. DMR-02-33773. The U.S. Government may therefore have certain rights in this invention.

TECHNICAL FIELD OF THE INVENTION

The present invention relates to quantum computing, and in particular relates to systems and methods for making partial Bell-state measurements of Fermionic qubits using a Bell-state analyzer, and a quantum computer that employs the Bell-state analyzer.

BACKGROUND ART

Recent work has shown that quantum computation with photons is possible using only linear optics. Partial measurements of these optical quantum states are sufficient and, most remarkably, gates coupling qubits with each other are no longer required. The extension of this quantum computing approach to other types of qubits, in particular, systems based on Fermions, is desirable. A "Fermion" is a particle, such as an electron, proton, or neutron, that has half-integral spin ("spin ½") and that obeys statistical rules (namely, the Pauli exclusion principle) requiring that not more than one in a set of identical particles may occupy a particular quantum state. Extension of "measurement-based" quantum computation to Fermions is desirable because it would eliminate the need to control the strength and pulsing of the interaction between the qubits with extremely high precision. For measurement-based quantum computation, this requirement is replaced with the much simpler one, namely to perform projective measurements, where a precise control of the coupling strength to the measurement apparatus is not required.

It is known that full Bell-state measurements (all four Bell states are differentiated) with some initial source of entanglement or partial Bell state measurements (only the parity subspace is determined) are in principle sufficient for universal quantum computing. Still, the most crucial element—the physical implementation of such measurements for Fermions—has not been found so far.

The spin degree of freedom of the electron promises many applications in the field of spintronics. Moreover, single electrons can be controlled via their charge, confining them in quantum dot structures in the Coulomb blockade regime. The spin qubit proposal combines these two fields of research and uses the spin of electrons confined to quantum dots as qubits for quantum computation, where the spin-½ state of each electron encodes exactly one qubit. That proposal includes two-qubit quantum gates relying on exchange interaction of coupled quantum dots and comprises spin-to-charge conversion for efficient read-out schemes, satisfying all theoretical requirements for quantum computing. However, if a partial Bell state measurement can be implemented in a physical system, two-qubit quantum gates are no longer required, implying considerable simplifications towards the goal of realizing a scalable quantum computer.

SUMMARY OF THE INVENTION

The present invention is directed to systems and methods for performing partial Bell state measurements of Fermionic qubits, allowing for deterministic quantum computing in solid-state systems without the need for two-qubit gates. Generally, the invention utilizes two spin-qubits in a quantum dot system (e.g., two or more quantum dots), wherein at least two of the quantum dots have different Zeeman splittings. When properly configured, resonant tunneling between quantum dots having different Zeeman splittings is only allowed when the spins are anti-parallel, and not otherwise. This converts spin parity into charge information via a projective measurement. This measurement-based approach greatly simplifies implementing scalable quantum computers in electronic nanostructures because, among other things, it eliminates the need for two-qubit quantum gates.

The partial Bell-state measurement involves determining the parity of the two qubit spins, i.e., one needs to differentiate the spin states with anti-parallel spins, $|T_0\rangle, |S\rangle = (|\uparrow\downarrow\rangle \pm |\downarrow\uparrow\rangle)/\sqrt{2}$, from the states with parallel spins, $|T_+\rangle = |\uparrow\uparrow\rangle$, $|T_-\rangle = |\downarrow\downarrow\rangle$. However, the measurement must be "nondestructive" with respect to these two subspaces, i.e., a superposition such as the Bell state $|\Psi_2\rangle = (|\uparrow\uparrow\rangle + |\downarrow\downarrow\rangle)/\sqrt{2}$ must be left unchanged.

Using two such parity measurements, an aspect of the invention includes constructing a CNOT gate on two spin qubits by using an additional ancilla qubit (in the form of an electron on an additional quantum dot), a single qubit measurement, and by applying single-qubit operations depending on the measurement outcomes. Since the CNOT gate is a universal quantum gate, partial Bell state measurements using the Bell-state analyzer of the present invention and single qubit operations are sufficient to build a universal quantum computer. Conversely, if CNOT gates are available, nondestructive parity measurements can be performed. Another alternative is to use full Bell state measurements, but this requires preparation of initial entanglement as a resource.

Figure 1:
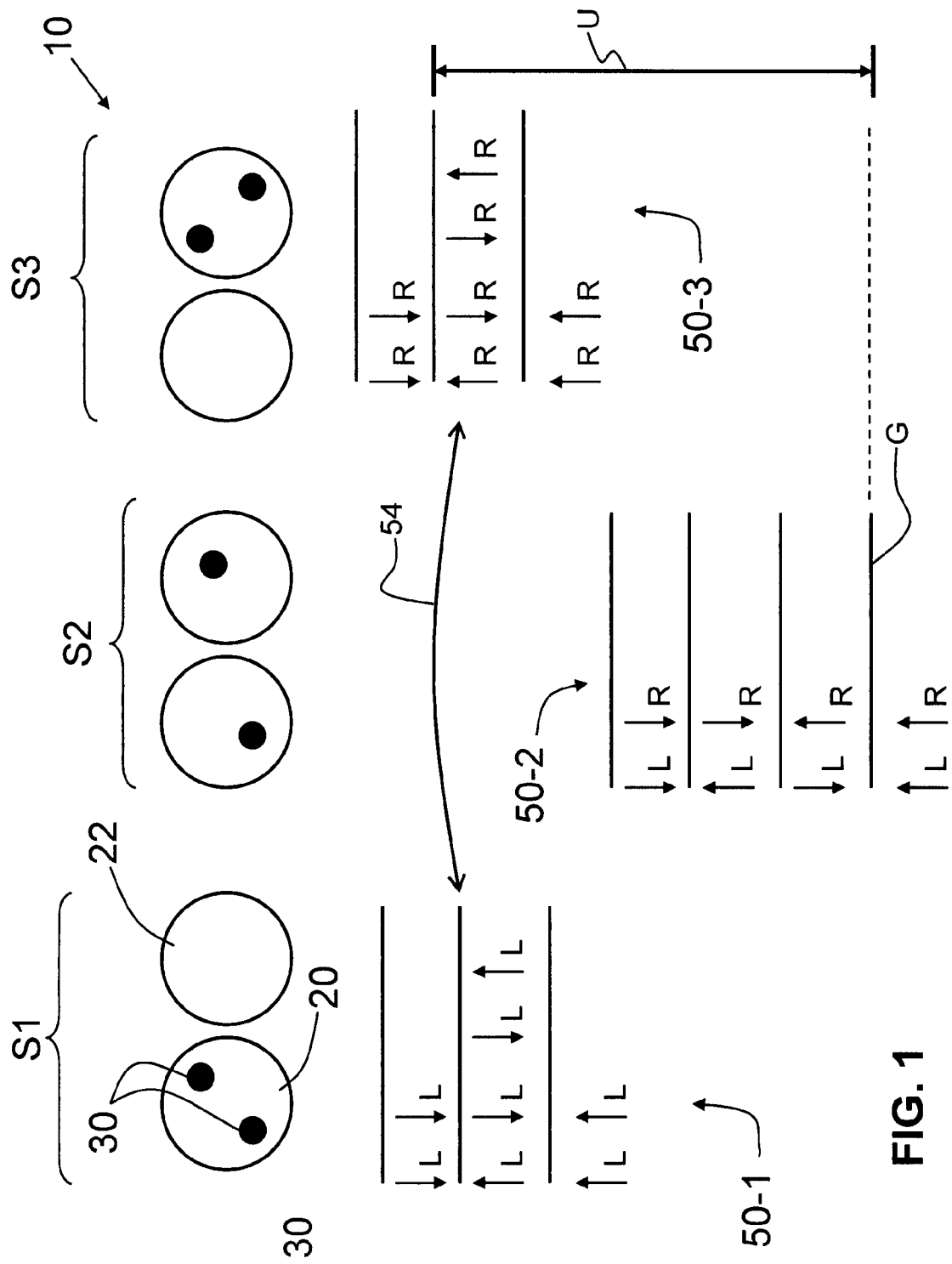
FIG. 1 is a schematic diagram of an example embodiment of the two-quantum-dot Bell-state analyzer system of the present invention, where each quantum dot is capable of containing two Fermions in the form of electrons, and also showing the energy spectra for the system for each of three possible charge states of the quantum dots.
Figure 4:
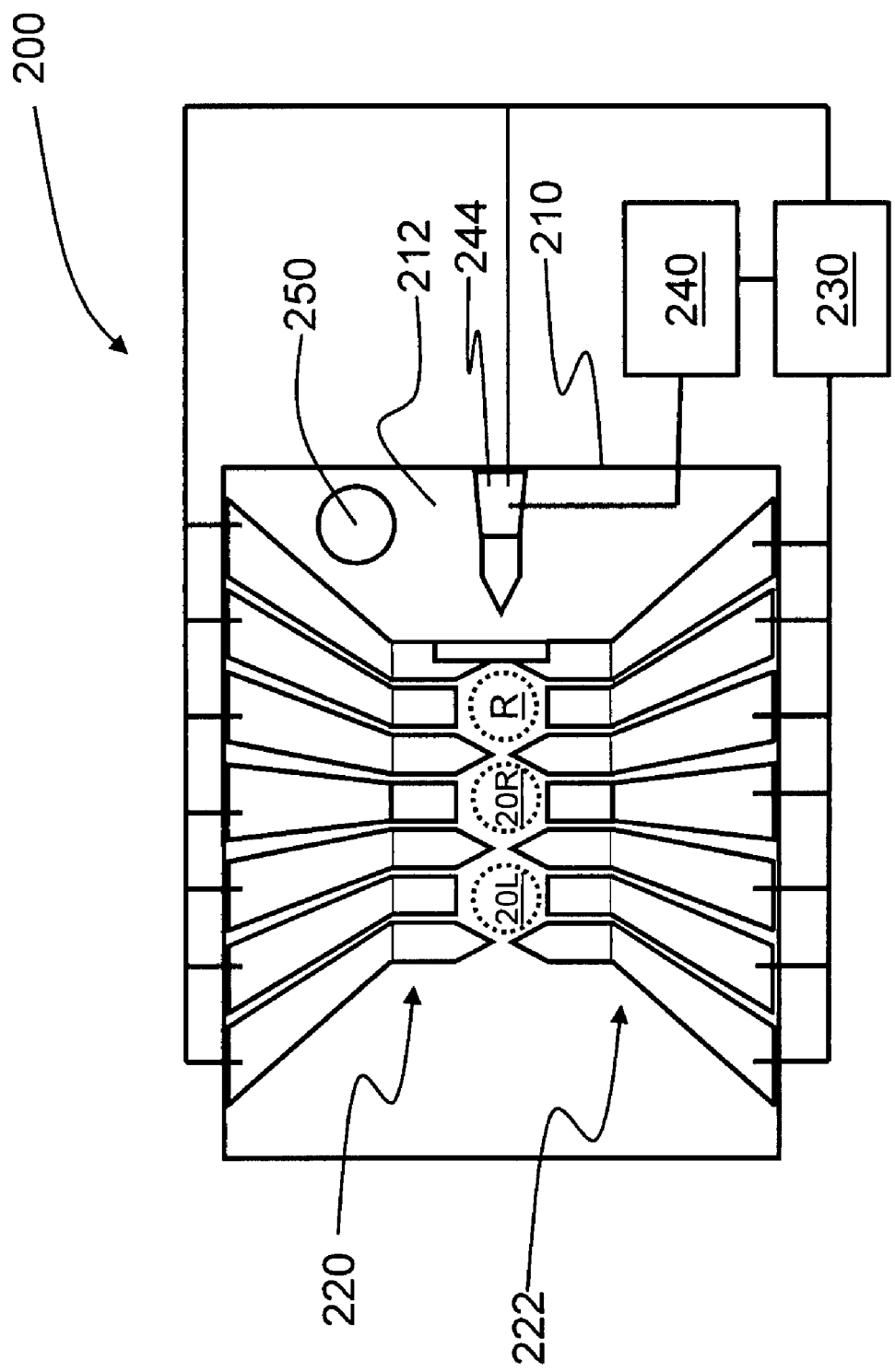
Figure 5:
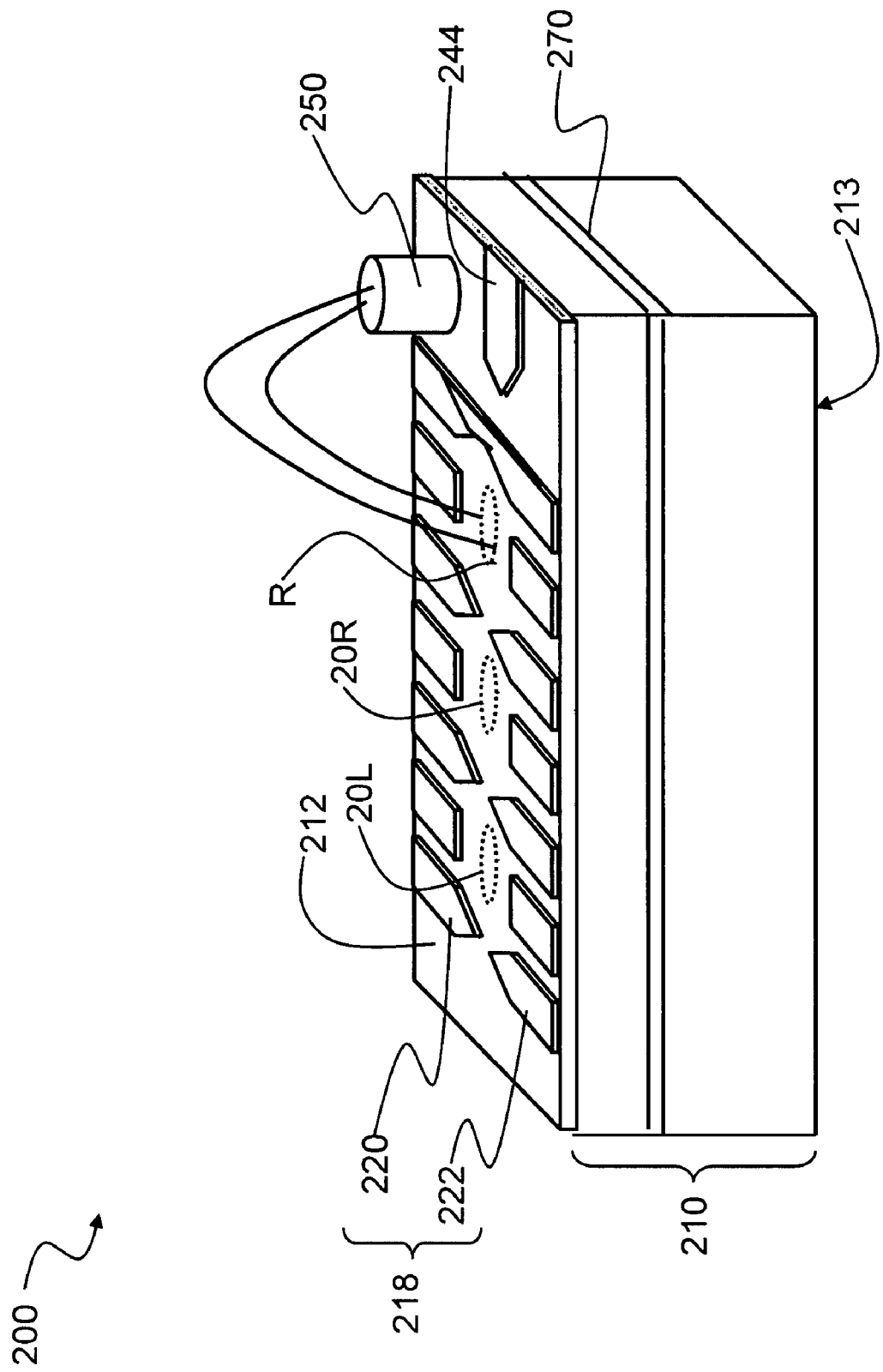
Figure 6:
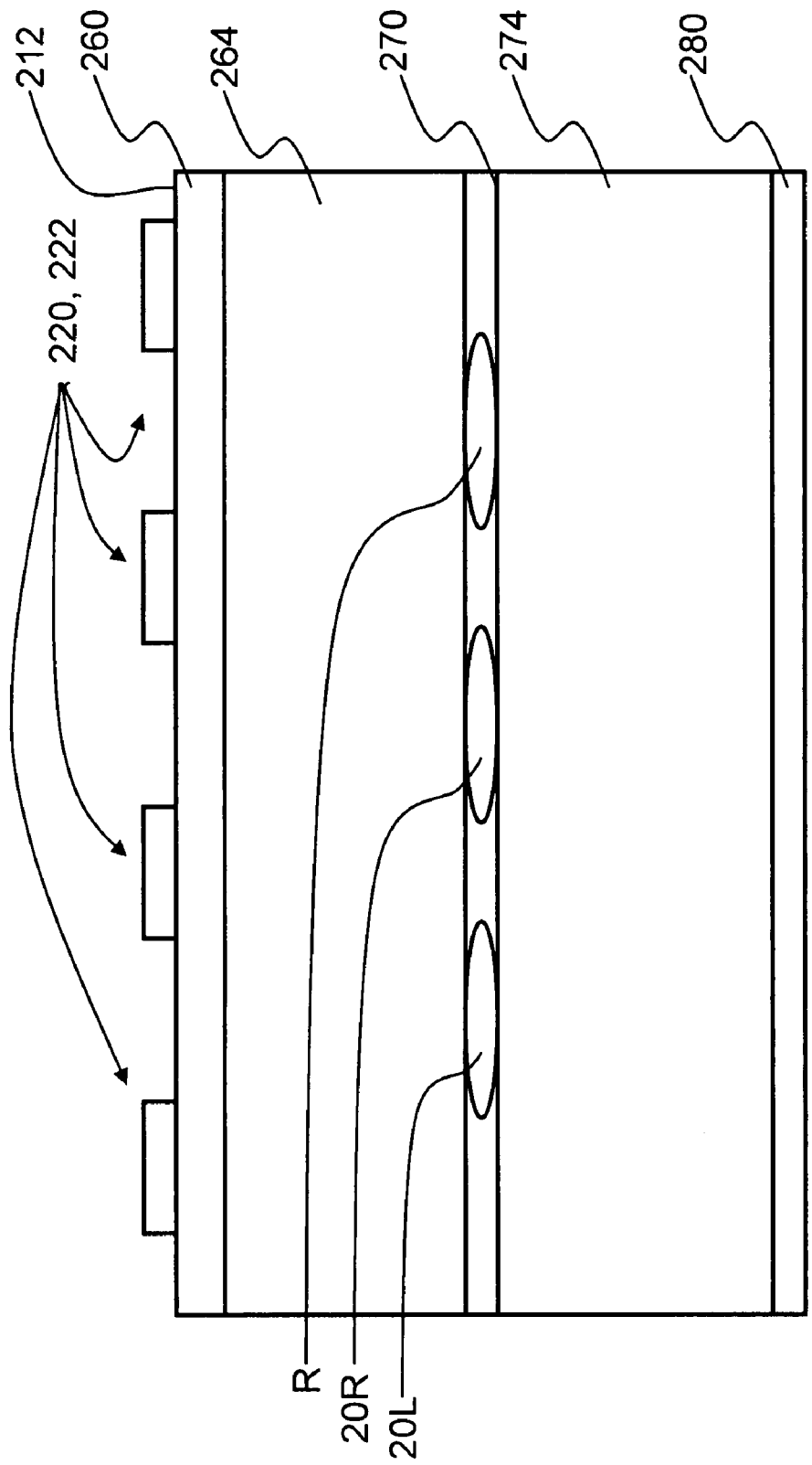
Figure 7:
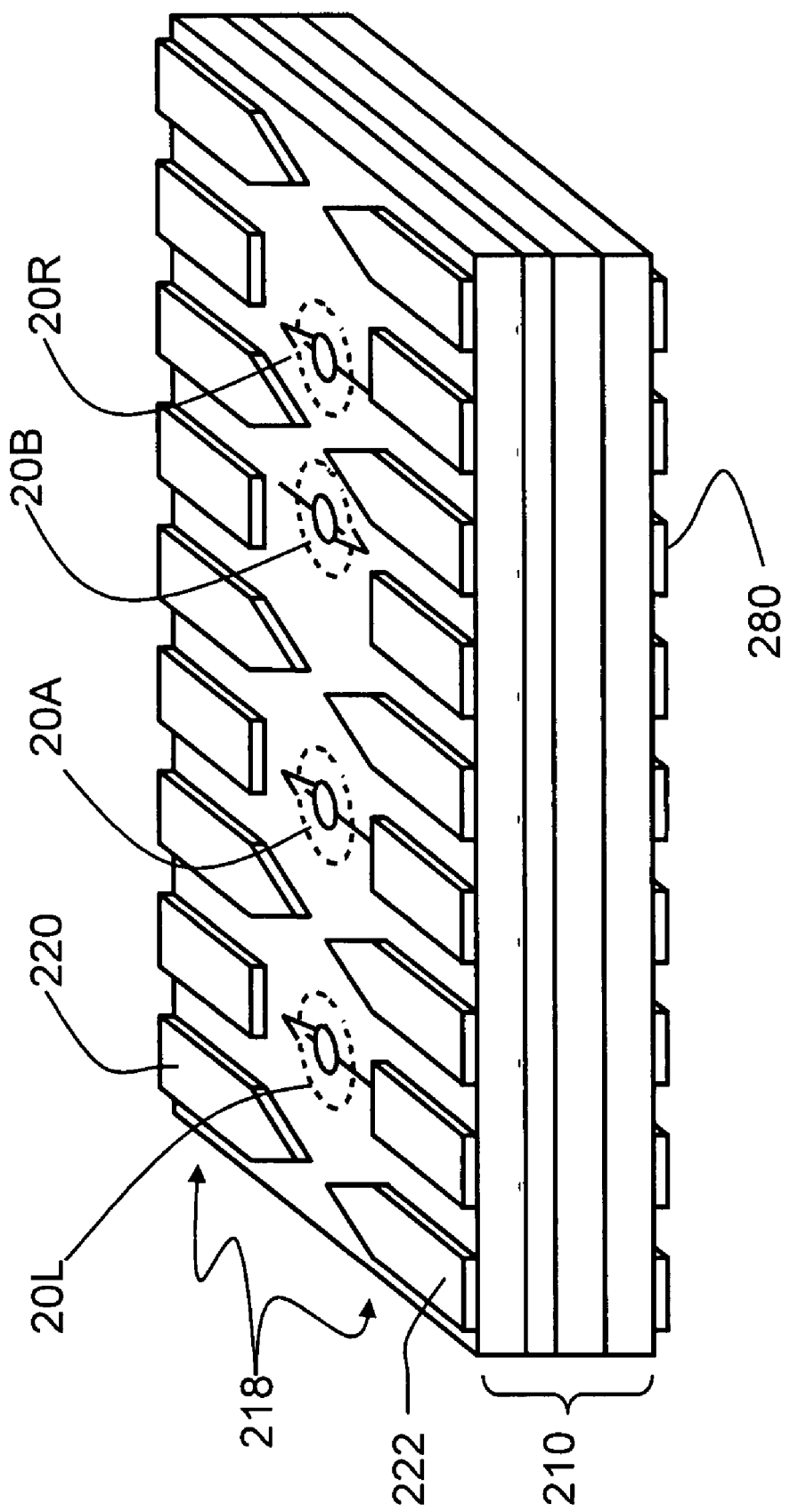
Figure 8B:
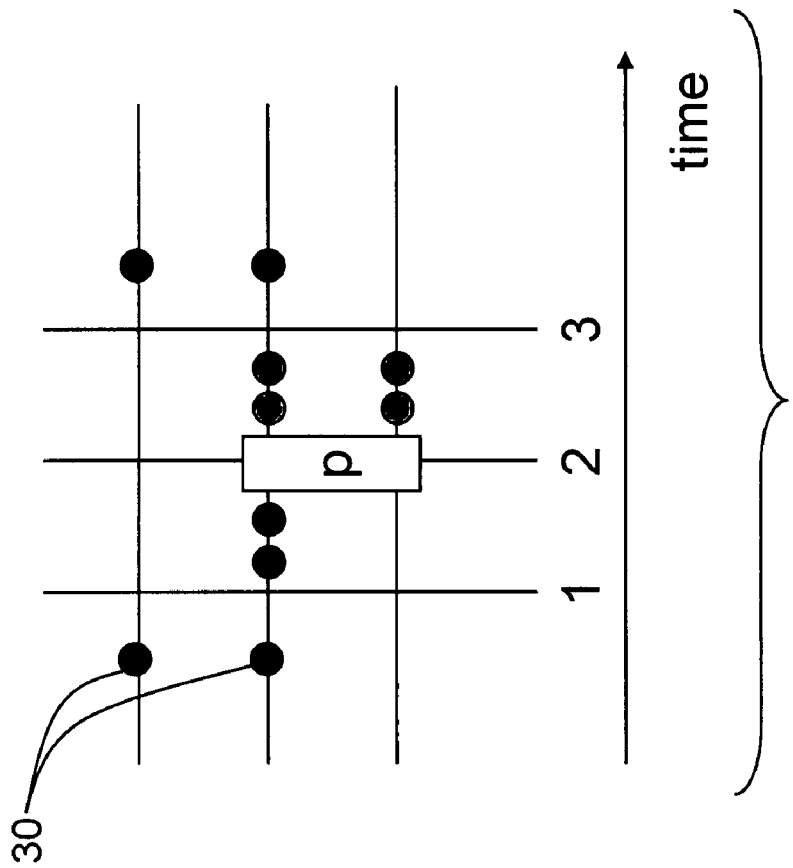
Figure 8A:
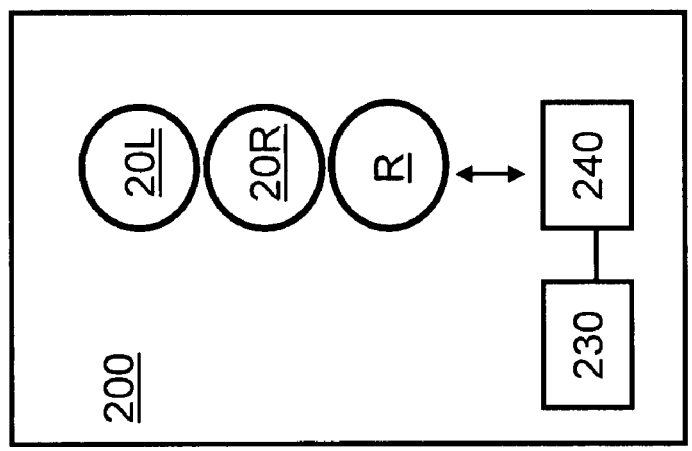
Figures 9A, 9B:
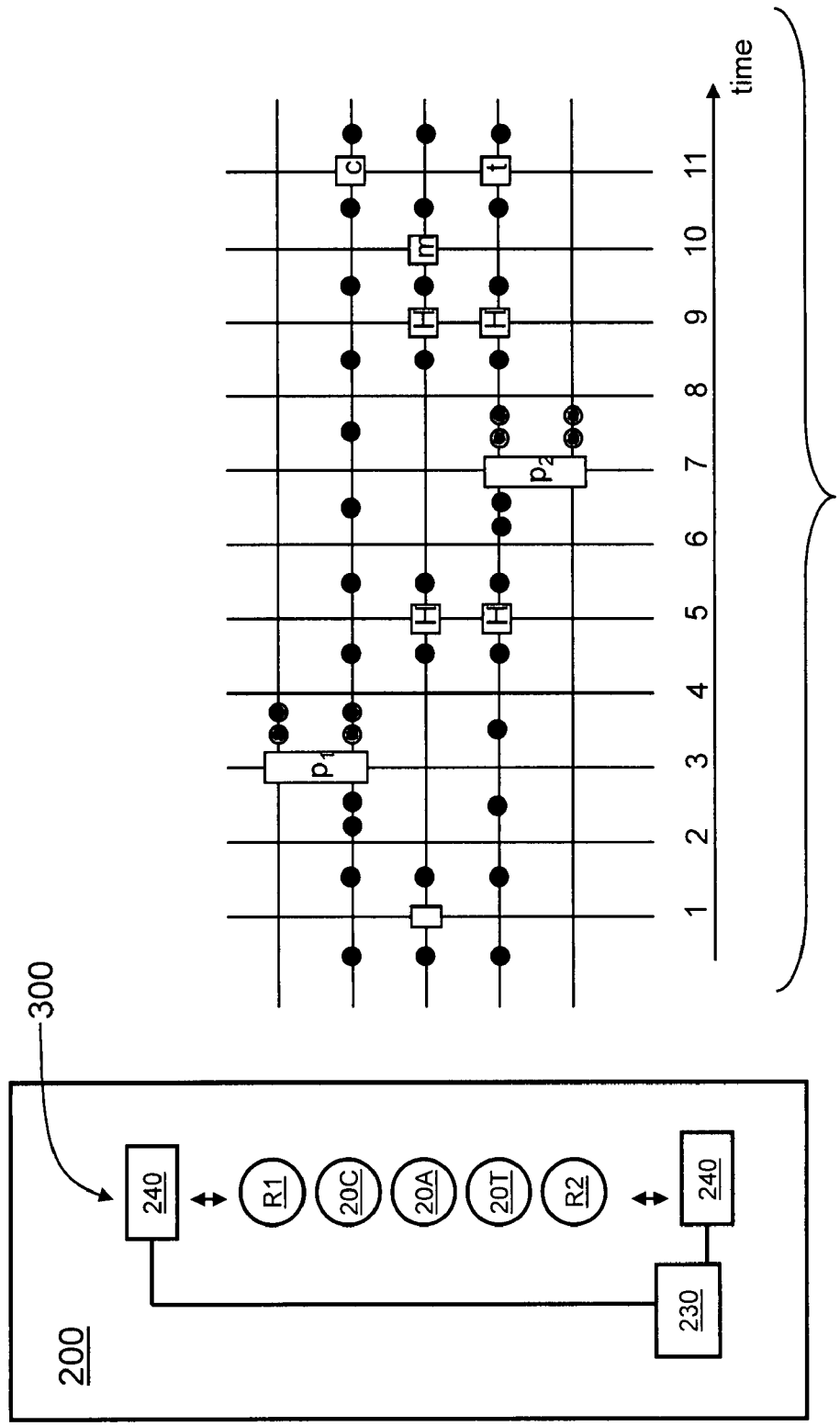

of the double quantum dot system of FIG. 1, including all states of the model, wherein $t_T$ and $t_S$, are the tunneling amplitudes for the triplet and singlet states, respectively, and $J_{RR}$ and $J_{LL}$ are the energy separations between the charge states LL and RR;

FIG. 4 is a top-down view of an example embodiment of a solid-state semiconductor-based Bell-state analyzer according to the present invention as an example implementation of the analyzer shown schematically in FIG. 1;

FIG. 5 is a perspective view of the apparatus of FIG. 4, showing the various layers of the semiconductor structure and an example embodiment that uses a micromagnet unit to control the Zeeman splitting of the quantum dots;

FIG. 6 is a close-up detailed cross-sectional view of the analyzer of FIGS. 4 and 5, showing the quantum dots formed in the two-dimensional electron gas layer;

FIG. 7 is a perspective view of an example analyzer that includes four spin qubits in the form of four quantum dots 20L, 20A, 20B, 20R, illustrating the spin orientation of up (↑) or down (↓) for each quantum dot as controlled by the electrode array;

FIG. 8A is a schematic diagram of an example embodiment of the Bell-state analyzer of FIG. 4 that includes two quantum dots as input qubits and a third quantum dot as a "reference" quantum dot used for the parity measurement, illustrating how the analyzer is used to form a quantum computer system that implements a parity gate;

FIG. 8B is a time-evolution diagram illustrating the operation of the Bell-state analyzer of FIG. 4 acting on the three quantum dots of FIG. 8A to implement the parity gate;

FIG. 9A is a schematic diagram of an example embodiment of the Bell-state analyzer of the present invention having five quantum dots R1, 20T, 20A, 20C and R2, illustrating how the analyzer is used to form a quantum computer that implements a CNOT gate;

FIG. 9B is a time-evolution diagram illustrating the operation of the Bell-state analyzer of FIG. 4 acting on the quantum dot array of FIG. 9A to implement the CNOT gate; and FIG. 10 is a table illustrating the conditional operations of the CNOT gate formed by the five-quantum-dots analyzer of FIG. 9A, wherein p1, p2 and represent the outcome of first and second parity measurements, m represents the outcome of a spin measurement, I stands for "identity," "C" and "T" respectively stand for qubits 20C and 20T, and X and Z respectively stand for $\sigma_X$ and $\sigma_Z$.

The various elements depicted in the drawing are merely representational and are not necessarily drawn to scale. Certain sections thereof may be exaggerated, while others may be minimized. The drawing is intended to illustrate an example embodiment of the invention that can be understood and appropriately carried out by those of ordinary skill in the art.

DETAILED DESCRIPTION OF THE INVENTION

Generalized Method

A general approach of the present invention for making a partial Bell state (parity) measurement of two qubits that relies on spin-to-charge conversion is now described. The description follows the article by the present inventors H. A. Engel and D. Loss, entitled "Fermionic Bell-State Analyzer for Spin Qubits," Vol. 309 SCIENCE, pp. 586-588, published on 22 Jul. 2005 (the "SCIENCE" article), which article is incorporated by reference herein. Also incorporated by reference herein is the "supporting material" for the SCIENCE article, which is included directly in the aforementioned U.S. Provisional Patent Application and which is also available at: www.sciencemag.org/cgi/content/full/309/5734/586/DC1.

FIG. 1 is a simplified schematic diagram of a Bell-state analyzer 10 that includes two tunnel-coupled quantum dots 20L and 20R (where L and R stand for "Left" and "Right"), with each quantum dot capable of containing two spin ½ particles in the form of electrons 30. The energy spectra 50-1, 50-2 and 50-3 for each of three possible charge states S1, S2 and S3 is also shown, wherein G is the ground state and U represents the energy difference between the ground state and the state where the electron spins are anti-parallel, as indicated by horizontal arrow 54.

In an example embodiment, electrons 30 are controlled by gate voltages in a solid-state embodiment of analyzer 10, as described in detail below. In an example embodiment, the gate voltages $V_G$ are tuned such that in the ground state G there is a single electron 30 on each quantum dot, as illustrated in state S2. Further, both electrons 30 can be moved to the left quantum dot 20L or to the right quantum dot 20R by changing the gate voltage $V_G$. It is assumed that these two charge states, |LL> and |RR>, are degenerate. The energy difference $U = E_{LL} - E_{LR}$ to the ground state G=|LR> is given by the sum of the charging energies of each quantum dot, reduced by the capacitative coupling between the two quantum dots.

Qualitative Description of the Partial Bell-State Measurement

In an example embodiment of analyzer 10, quantum dots 20R and R have different Zeeman splittings $\Delta_z^L$ and $\Delta_z^R$, where the electron position is denoted as "L" for quantum dot 20R (because it is to the left of quantum dot R), and as "R" for quantum dot R. In one approach, this is achieved by subjecting the quantum dots to locally different magnetic fields. In another approach, this is achieved via inhomogeneous g factors due to different materials or nuclear polarizations for each quantum dot. This configuration converts spin parity into charge, as tunneling is only resonant for anti-parallel spins. Finally the charge distribution is measured, e.g., with a charge detector, such as a quantum point contact (QPC) measurement system. An example QPC measurement system is disclosed in the article by M. Field et al., Phys. Rev. Lett. 70, 1311 (1993), which article is incorporated by reference herein. With a time resolved measurement, the individual tunneling events are identified. In the present invention, a time-averaged measurement is sufficient to perform the partial Bell measurement because parallel spins of electrons 30 always remain on left quantum dot 20L.

In order to check if this method works for a realistic apparatus, microscopic modeling is used to give a quantitative description of the read-out process. As is seen below, the method is robust (within defined limits) against non-ideal processes that can decohere and mix the quantum states.

The QPC read-out apparatus is modeled by considering only the lowest orbital energy states of quantum dots 20L and 20R for a given charge and spin configuration. Excited states are discussed in the section below in the Appendix. The twelve states where two electrons with spins σ, σ' are both on the left (right) quantum dot, $|\sigma_L \sigma'_L\rangle$ ($|\sigma_R \sigma'_R\rangle$) or are in different quantum dots, $|\sigma_L \sigma'_R\rangle$ are considered. When both electrons 30 are on the same quantum dot, the spin state can be in the singlet or triplet configuration, with energy separation $J = E_{T_0LL} - E_{SLL}$. It is well-known that this singlet-triplet splitting can be tuned to zero via magnetic fields. The coupling between the left quantum dot 20L and right quantum dot 20R is described with the tunneling amplitudes $t_S$ and $t_T$ for singlet and triplet states. First considered is the symmetric case J=0 and $t_S = t_T$.

Next, the transition rates for the tunneling between the charge states LL and RR, as function of the level detuning E are found. For this, the charge states {|LR⟩, |LL⟩, |RR⟩} are considered, and a model Hamiltonian is defined by the eigenenergies $E_{LR}=0$ and $E_{LL,RR}=U\mp\epsilon/2$ (in the absence of tunneling) and the tunneling $H_T=t_d|LL\rangle\langle LR|+t_d|RR\rangle\langle LR|+$ H.c. The double quantum dot state is then described with the reduced density matrix $\rho(t)$ and its time evolution determined with a Bloch-Redfield master equation. The diagonal elements $\rho_n$ describe the probabilities of a given charge state |n⟩ of the double quantum dot. The off-diagonal elements $\rho_{nm}$ describe a superposition of double quantum dot states |n⟩ and |m⟩. These off-diagonal elements need to be considered, since at short time scales the tunneling is coherent and superpositions of charge states are formed. However, such superpositions decay rapidly, with a typical charge-dephasing rate $\Gamma_d\approx(\ln s)^{-1}$. Generally, there are different dephasing rates, $\Gamma_{d1}$ for superpositions of |LR⟩ and |LL⟩ (or |RR⟩) and a rate $\Gamma_{d2}$ for a superposition of |LL⟩ and |RR⟩. Of interest are time scales wherein the charge distribution on the double quantum dot can be measured, i.e., in times longer than $1/\Gamma_d$, thus we can set $\dot\rho_{nm}=0$. This allows for simplifying the master equation to a classical rate equation, and to identify the following effective tunneling rates. First, the tunneling of both charges (i.e., electrons 30) from left quantum dot 20L to right quantum dot 20R, as indicated by horizontal arrow 54 and written as "L↔R," is given by $$W_{L\leftrightarrow R} = \frac{2t_d^4}{U^2}\frac{\Gamma_{d2}}{\varepsilon^2+\Gamma_{d2}^2}. \quad (1)$$

This corresponds to a resonant process and the effective rate is maximal when the detuning $\epsilon$ vanishes. The width of the rate is given by the dephasing rate $\Gamma_{d2}$. In particular, for $\epsilon>\Gamma_{d2}$ the tunneling is suppressed. Further, there is an effective rate describing the relaxation to the ground state, e.g., LL→LR, $$W_{relax} = \frac{2t_d^2\Gamma_{d1}}{U^2}. \quad (2)$$

This rate is consistent with transport experiments through double quantum dots, which indicate relaxation on a time scale of $\geq 1$ μs for $t_d=10$ μeV and U=1 meV. Further, an intrinsic rate $\Gamma_r$ can be included to describe additional inelastic tunneling processes, where for example a phonon is emitted and the quantum dot relaxes to the ground state. Note that experimental data indicate that $\Gamma_r<<\Gamma_d$, i.e., adjustments of the off-diagonal rates due to $\Gamma_r$ are not relevant.

With this model, an estimation of the required range for the relevant parameters can be made. In this regard, there are two main criteria to be met. First, the QPC read-out should be efficient in the sense that the parity of the spin state be detected with a high probability. Thus, within a given time, tunneling of an anti-parallel spin state should be observed, while a parallel spin state should not tunnel. Comparing tunneling rates (Eq. (1)) at resonance and for detuning due to anti-parallel spins, the requirement is identified as: $4(\Delta_z^R-\Delta_z^L)^2>\Gamma_{d2}^2$. This can be satisfied for typical GaAs quantum dots, e.g., for a magnetic field of B=1 T and a difference in g-factors between the quantum dots of $\Delta g$=0.01. Second, the relaxation to the ground state |LR⟩ must be slow compared to the resonant tunneling of parallel spins, otherwise the charge state relaxes before the spin state has been measured. Moreover, this decay to the ground state leads possibly to decoherence of the spin state. According to Eqs. (1) and (2), the condition $t_d>\Gamma_d$ obtains, which can be satisfied with typical operational parameters.

Figure 2:
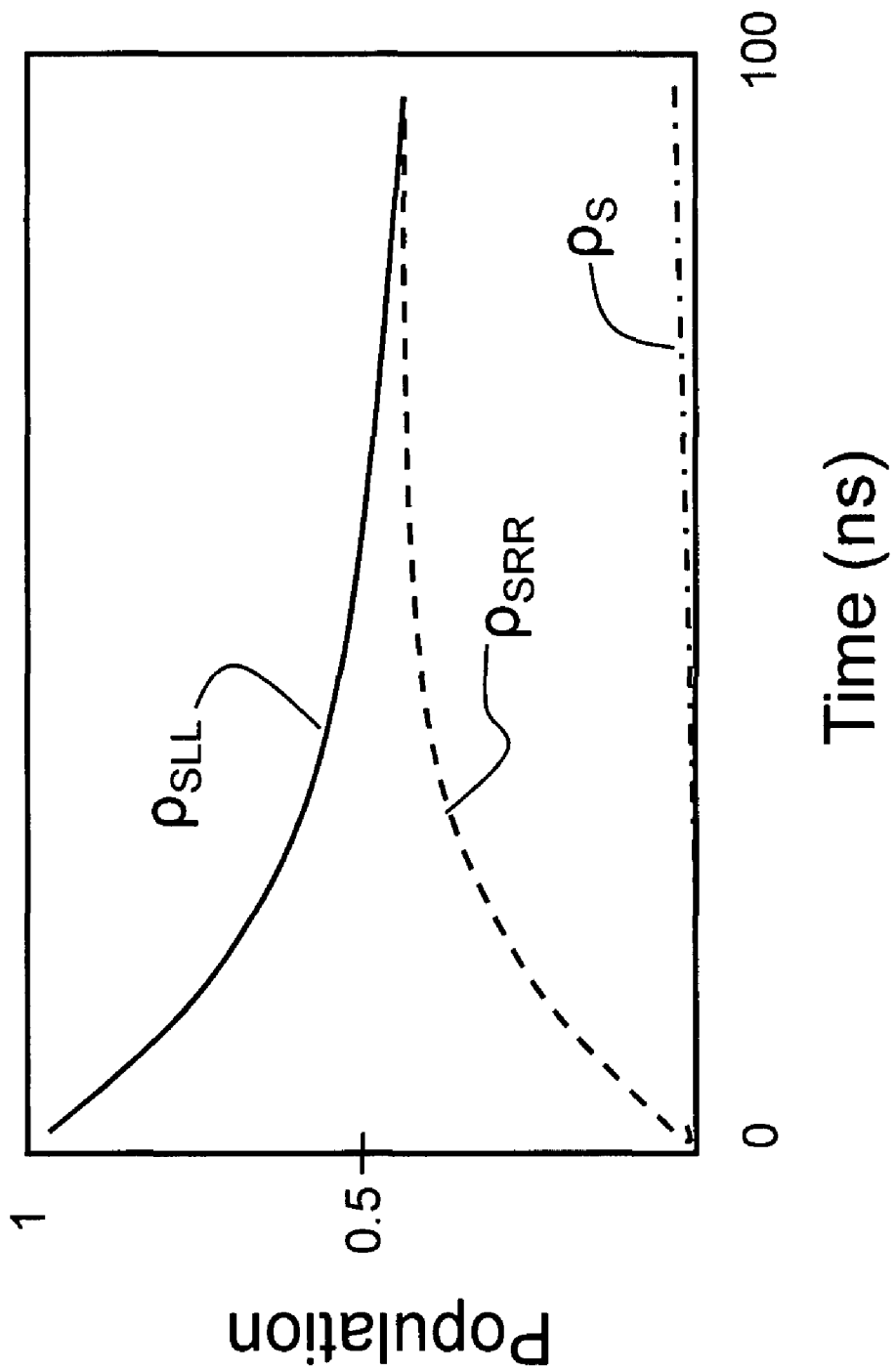
FIG. 2 is a plot of a simulation of the time-evolution of the electron population in the quantum dots versus time for the system of FIG. 1, starting with an initial population state $|\Psi_0\rangle = |SLL\rangle = (|\uparrow_L\downarrow_L\rangle - |\downarrow_L\uparrow_L\rangle)/\sqrt{2}$ and using the parameters $t_d = 10\,\mu eV$, $U=1\,meV$, $1/\Gamma_{d2}=1\,ns$, $B=1\,T$, and $\Delta g=0.05$.

FIG. 2 is a plot of a simulation of the time-evolution of the electron population in the quantum dots versus time for the system of FIG. 1, starting with an initial population state $|\Psi_0\rangle=|SLL\rangle=(|\uparrow_L\downarrow_L\rangle-|\downarrow_L\uparrow_L\rangle)/\sqrt{2}$ and using the parameters $t_d$=10 μeV, U=1 meV, $1/\Gamma_{d2}$=1 ns, B=1 T, and $\Delta g$=0.05. For anti-parallel spin (e.g., $|\Psi_0\rangle$), tunneling LL↔RR occurs on a time scale of $1/W_{L\leftrightarrow R}$ ($\epsilon$=0)≈20 ns. On this time scale, the state of system 10 will relax to a mixture, with both electrons 30 either on the left quantum dot 20L or on the right quantum dot 20R. This mixture is detected via the QPC current. However, it must be distinguished from the case of parallel spins, where tunneling is strongly suppressed and only occurs on the time scale of 2 μs, defining the required time resolution of the QPC signal. This does not impose a fundamental requirement of fast charge read-out, since this time can be increased by using larger B or $\Delta g$. However, a fundamental limit is set by inelastic charge relaxation.

Full Dynamics Analysis

For analyzing the full dynamics of Bell-state analyzer 10, the back-action of the QPC (including dephasing) needs to be taken into account microscopically. Details of this analysis are provided below in the Appendix. First, the dynamics of analyzer 10 are diagonalized, and then the tunneling through the QPC is evaluated in lowest order. Since the z-component of the total spin is conserved, it is sufficient to consider a 6×6-density matrix. The explicit master equation for this density matrix is then obtained. However, since this analytical result is lengthy, it is relegated to the Appendix.

The initial state $|\Psi_0\rangle$ is considered, and the singlet populations of the left state $\rho_{SLL}$ (solid line), of the right state $\rho_{SRR}$ (dashed line), and of the ground state $\rho_S$ (dashed-quantum dotted line) are plotted in FIG. 2. Note that the singlet population remains 1 at the end of the measurement, i.e., there is no admixture of the triplet state $|T_0\rangle$. Note also that it is well known that relaxation processes to the other triplet states are also suppressed. This implies that superpositions like $|\uparrow\downarrow\rangle-|\downarrow\uparrow\rangle$ remain unaffected, i.e., that the measurement scheme does not destroy coherence within the parity subspaces, so that partial Bell measurements are feasible.

Method Reaches the Quantum Limit of Efficiency

It is important to determine whether the Bell-state measurement method reaches the quantum limit of measurement efficiency. A single qubit read-out and the parity measurement need to distinguish between two states/subspaces i=1, 2. When the detected signal is Gaussian distributed with a mean $\mu_i$ and a standard deviation $\sigma_i$, the infidelity $\alpha$ is the probability of obtaining the wrong measurement result and is given by $z_{1-\alpha}=|\mu_2-\mu_1|/(\sigma_1+\sigma_2)$, where $z_{1-\alpha}$ is the quantile of the standard normal distribution, i.e., $$1-\alpha = \frac{1}{2}\left[1+\operatorname{erf}(z_{1-\alpha}/\sqrt{2})\right].$$

One assumption often made is to set $z_{1-\alpha}=\sqrt{2}$, i.e., one implicitly considers measurements with infidelity $\alpha$=7.9%. With this choice of $\alpha$, the quantum limit of measurement is defined such that the measurement rate $\Gamma_{meas}$ (the inverse measurement time that is required to obtain $\alpha$=7.9%) is equal to the decoherence rate $\Gamma_\phi$ of the quantum system.

For a partial measurement, the decoherence of a superposition of states with different parity is part of the projective quantum measurement process. To evaluate $\Gamma_{meas}$ and $\Gamma_\varphi$, the simple 3×3 model is extended to a 6×6 model, which considers states that are at resonance (anti-parallel spins), or are off-resonant (parallel spins). Initially, both electrons 30 are on the left quantum dot 20L, but in a superposition of states with different parity. By accounting for tunneling to the right quantum dot 20R and by eliminating the off-diagonal elements with different charge, the effective measurement rate and the decoherence rate is obtained, viz., $$\Gamma_\varphi = \Gamma_{meas} = \frac{1}{2} W_{L \leftrightarrow R}, \quad (3)$$

which shows that the Bell-state measurement method of the present invention operates in the quantum limit of measurement.

Apparatus that Deviate from the Ideal Configuration

Even though the Bell-state measurement method of the present invention is theoretically capable of operating in the quantum limit of measurement, it is important to assess the effects on the method of non-ideal apparatus used to carry out the method in practice. In particular, imperfections due to extra phases resulting from the inhomogeneous Zeeman splittings, finite J, different tunnel couplings of singlet and triplet, and spin orbit interaction are considered, each of which can reduce the efficiency of the measurement.

Figure 3:
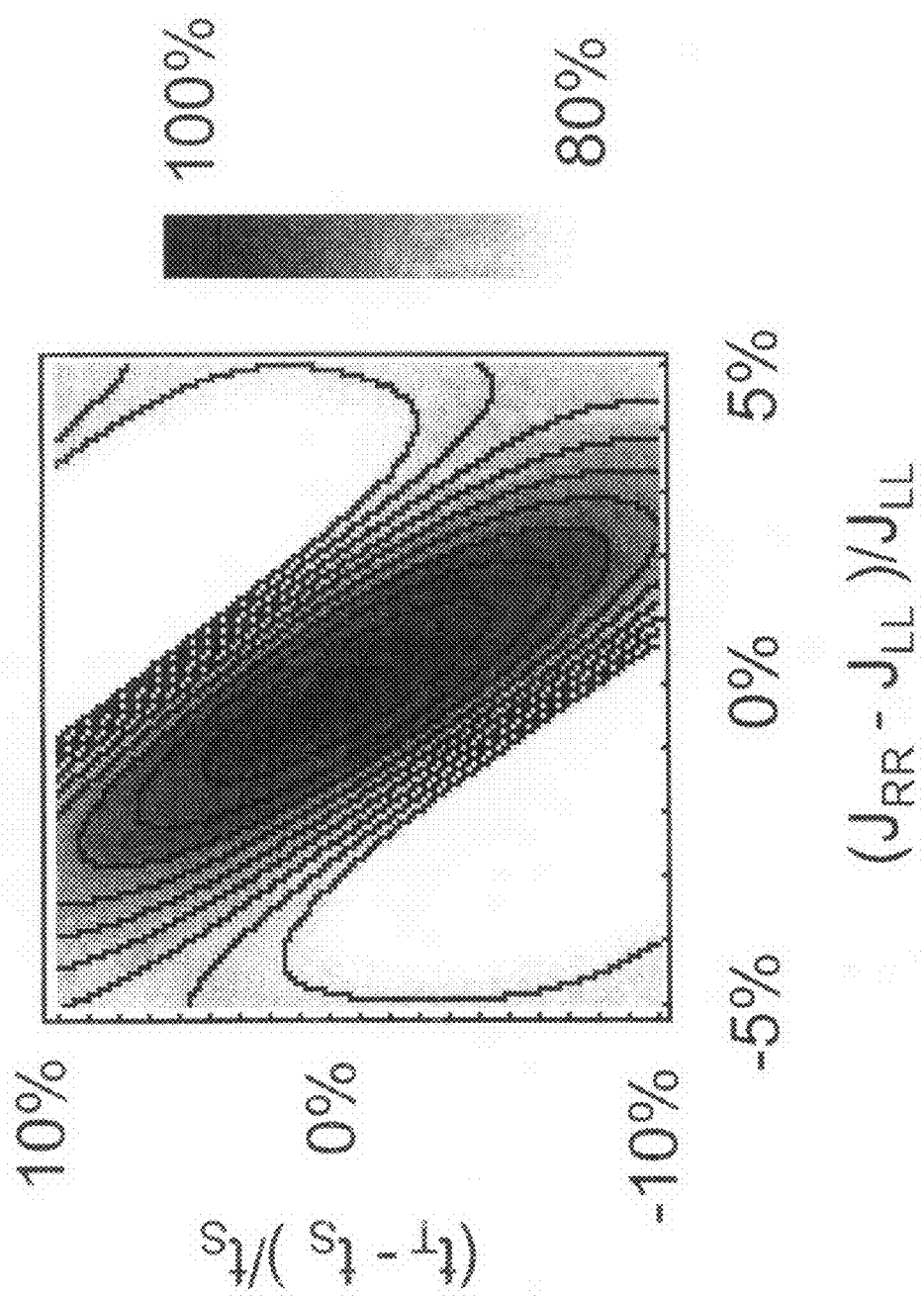
FIG. 3 is a two-dimensional plot of the fidelity of the partial Bell state measurement, resulting from the simulated time-evolution of the initial state $$(1/\sqrt{2})|\uparrow_L\downarrow_L\rangle + \frac{1}{2}|\uparrow_L\uparrow_L\rangle + \frac{1}{2}|\downarrow_L\downarrow_L\rangle$$

FIG. 3 is a two-dimensional plot of a simulation of the time-evolution of the initial state $$(1/\sqrt{2})|\uparrow_L \downarrow_L\rangle + \frac{1}{2}|\uparrow_L \uparrow_L\rangle + \frac{1}{2}|\downarrow_L \downarrow_L\rangle$$

of double-quantum-dot analyzer 10 of FIG. 1, including all states of the model (i.e., a 144 dimensional Liouville space). The state of the qubits in analyzer 10 is obtained after 100 ns and is described by the density matrix $\rho_f$. Ideally, one expects the initial state to decay to a mixture of different parities $\rho_e$, where the probability is 50% for having parallel spins on left quantum dot 20L (a dynamical phase $2\Delta_z^L$ is included due to Zeeman splitting) and the probability is 50% for having two anti-parallel spins, both on the left or both on the right quantum dot (a dynamical phase J is included between |S> and |T$_0$> states). By comparing the final state of this simulation with this ideal case, the measurement efficiency and the coherence of the parity of subspaces is simultaneously tested. The accuracy of the imperfect measurement is quantified with the Uhlmann (square-root) fidelity $F = Tr\sqrt{\rho_f^{1/2} \rho_e \rho_f^{1/2}}$, with F=100% in the ideal case. The same parameters as in FIG. 2 are used, but now with $J_{LL}=1$ μeV, and plot $F(J_{RR}, t_T)$ and show contour lines spaced at 2%.

It is found that even if analyzer 10 of FIG. 1 cannot be perfectly controlled, partial Bell measurements are still possible. Finally, it is noted that spin qubits decohere due to hyperfine interaction with nuclear spins, leading to computation errors. In an example embodiment of the present invention, such decoherence is circumvented using any one of a number of techniques, such as by polarizing the nuclei, by using refocusing techniques, or by using materials without nuclear spins such as isotopically pure Si, Ge, nanowires, or carbon nanotubes.

Example Bell-State Analyzer Apparatus

The present invention includes a Bell-state analyzer used to perform quantum computation. As discussed above, an example of the Bell-state analyzer uses Fermions in the form of electrons confined to quantum dots to form the qubits used for quantum computing. Quantum information is stored in the two spin states of +½ or −½ of the qubits, which states are alternatively described herein as being up ($\uparrow$) or down ($\downarrow$).

Quantum computing operations are typically carried out by forming "quantum gates," wherein one or more of the qubits interact to perform a particular logic operation. Unlike classical logic gates where electrons flow between different circuit elements, in a quantum computer the qubits are stationary but their state(s) change to carry out the operation. The qubit states are determined via a quantum measurement. An example embodiment of the Bell-state analyzer apparatus of the present invention is adapted to perform partial and full Bell-state measurements on two spin qubits by spin-to-charge conversion and charge detection. For reading out single-spin qubits, the qubit information is converted from spin to charge.

FIG. 4 is a top-down view of an example embodiment of a solid-state semiconductor-based Bell-state analyzer apparatus 200 according to the present invention. FIG. 5 is a perspective view of apparatus 200 of FIG. 4, and FIG. 6 is a close-up detailed cross-sectional view of the apparatus. Apparatus 200 includes a layered semiconductor substrate 210 having an upper surface 212 and a lower surface 213. An electrode array 218 with opposing electrodes 220 and 222 are formed atop upper surface 212. Electrode array 218 is electrically coupled to a controller 230, and substrate 210 is electrically coupled to a charge current detector 240 via an electrode 244, which measures the current flowing in layer 270. In an example embodiment, charge detector 240 is a QPC read-out unit.

Apparatus 200 also includes quantum dots 20L, 20R and R formed within layer 270. Quantum dots 20L and 20R constitute a quantum dot pair, while quantum dot R is an "reference" quantum dot whose role is explained below. In an example embodiment, a micromagnet unit 250 is magnetically coupled to substrate surface 212 at a location corresponding to quantum dot R.

Substrate 210 includes a GaAs cap layer 260 (whose upper surface is surface 212), an AlGaAs layer 264 (which includes a Si n-doping layer) below the cap layer, a two-dimensional electron gas layer 270 formed below the AlGaAs layer, a GaAs substrate layer 274 below gate layer 270, and an optional back gate electrode layer 280 atop substrate lower surface 213. Electrode array 218, under the control of controller 230 and optionally working in combination with back gate electrode layer 280, allows for the formation of quantum dots 1, 2 and R within the substrate at layer 270. Quantum dots 20L, 20R and R are represented at surface 212 in FIGS. 4 and 5 by dotted lines to indicate that the electrons actually reside within the substrate in layer 270. It is known that quantum dots can be formed in such structures, as explained in the article by L. P. Kouwenhoven et al., "Electron Transport in Quantum Dots," Proceedings of the NATO Advanced Study Institute on Mesoscopic Electron Transport, edited by L. L. Sohn, L. P. Kouwenhoven, and G. Schon (Kluwer, Dordrecht, Series E345, 1997) p. 105-214, which article is incorporated by reference herein.

Controller 230 is adapted (e.g., programmed) to provide the current and voltage (i.e., gate voltage $V_G$, discussed above) needed to create electric fields that adiabatically move electrons into and between the quantum dots 20L, 20R and R. This includes allowing electrons to tunnel in and out of reference quantum dot R, and measuring the charge distribution therein via charge detector 240.

In an example embodiment, different Zeeman splittings of the quantum dots 20R and R are produced via micromagnetic unit 250 by creating a different magnetic field strength at each quantum dot.

FIG. 7 is a perspective view of an example embodiment of apparatus 200 that includes four spin qubits in the form of four quantum dots 20L, 20A, 20B, 20R. In an example embodiment, electrode array 218, under the control of controller 230, is adapted to control the positions of the electrons with spin orientation of up (↑) and/or down (↓) on each quantum dot.

Example Parity Gate Implementation

FIG. 8A is a schematic diagram of an example embodiment of the Bell-state analyzer 200 of the present invention that includes three quantum dots 20L, 20R and R to form a quantum computer system that implements a parity gate. FIG. 8B is a time-evolution diagram illustrating the operation of the Bell-state analyzer apparatus of FIG. 4 acting on the quantum dots in FIG. 8A to implement the parity gate. A parity gate is a fundamental logic gate that determines whether the input qubits are the same (i.e., have the same spin and thus an even parity) or different (i.e., have different spins and thus an odd parity). An example parity gate outputs a logical 0 if the inputs are the same and a logical 1 if the inputs are different.

In FIG. 8B, the vertical lines represent the time-evolution of three different steps, while the horizontal lines correspond to the particular quantum dot in FIG. 8A. Black quantum dots indicate the locations of electrons 30.

In an example embodiment, quantum dots 20L and 20R have a g-factor $g_w$, while reference quantum dot R has a g-factor $g_b \neq g_w$. Reference quantum dot R is initially empty, and quantum dots 20L and 20R each contain one electron 30. Thus, the quantum dot system in apparatus 200 starts out in charge state (20L, 20R, R)=(1, 1, 0), which is as shown to the left of step 1 in FIG. 8B.

In the operation of apparatus 200, controller 230 carries out the first step by driving electrode array 218 to cause the electron in quantum dot 20L to adiabatically move to quantum dot 20R. This places the system in the charge state (0, 2, 0), as indicated in FIG. 8B for step 1. In step 2, controller 230 then causes a parity (charge) measurement "p" to be made by charge detector 240 using reference quantum dot R by allowing tunneling of the electrons in quantum dot 20R into the reference quantum dot and measuring the charge distribution, e.g., via a QPC current. Since this charge distribution is parity dependent, the measurement extracts the parity of initial qubits 20L and 20R. After the parity measurement, both electrons are on the same quantum dot, although it is not determined which one. This uncertainty is indicated by the gray dots in FIG. 8B for step 2. In step 3, controller 230 then drives electrode array 218 to cause the electrons to adiabatically move back to quantum dots 20L and 20R to return to state (1, 1, 0). Thus, a parity of the qubits is determined via a charge measurement using reference quantum dot R.

Example CNOT Gate Implementation

FIG. 9A is a schematic diagram of Bell-state analyzer apparatus 200 having an array of quantum dots R1, 20C, 20A, 20T and R2 that form a quantum computer that implements a CNOT gate. FIG. 9B is a time-evolution diagram illustrating the operation of the Bell-state (parity) analyzer apparatus 200 acting on the quantum dot array of FIG. 9A to implement the CNOT gate. FIGS. 9A and 9B are analogous to FIGS. 8A and 8B. Here, "T" stands for "target," "C" stands for "control," and "A" stands for "ancilla."

In an example embodiment, quantum dots 20C, 20A and 20T have a g-factor of $g_w$, while the reference quantum dots R1 and R2 have a g-factor of $g_b \neq g_w$. The protocol for implementing this example CNOT gate is based on the work set forth in the article by Beenakker et al., Phys. Rev. Lett. 93, 020501 (2004), which article is incorporated by reference herein.

Prior to the first step, system 300 contains arbitrary qubit states "T" and "C." In step 1, quantum dot 20A is prepared in state $(|0\rangle + |1\rangle)/\sqrt{2}$. In step 2, controller 230 controls electrode array 218 to move an electron 30 from quantum dot 20A to quantum dot 20C. In step 3, a first parity (charge) measurement p1 is made using charge detector 240 applied to reference quantum dot R1, as described above. In step 4, controller 230 drives electrode array 218 to cause the electrons to move back quantum dots 20C and 20A. In step 5, Hadamard single-qubit gates are performed on quantum dots 20A and 20C. In step 6, controller 230 causes an electron to move from quantum dot 20A to quantum dot 20T. In step 7, a second parity measurement p2 is made using charge detector 240 applied to reference quantum dot R2. In step 8, controller 230 drives electrode arrays 220 and 222 to cause the electrons in R2 to move back to quantum dots 20T and 20A. In step 9, Hadamard single-qubits gates are performed on quantum dots 20A and 20T. In step 10, a spin measurement m is made on quantum dot 20A. Such a measurement can be implemented by coupling this dot to a lead and measuring the time to tunnel from the quantum dot into the lead by observing the charge state of the quantum dot using an additional QPC (not shown). Because this time depends on the spin state, this allows inferring the spin state.

FIG. 10 is a table that sets forth conditional operations for implementing a CNOT gate based on parity measurements p1 and p2, and spin measurement m. Detection of even parity (superposition of $|00\rangle$ and $|11\rangle$ is labeled as "0" and odd parity is labeled as "1." In step 11 of FIG. 9B, single qubit gates listed on the right-hand side are applied to qubits 20C and 20T. In the table "I" stands for "identity" (i.e., "do nothing"), X for $\sigma_X$ and Z for $\sigma_Z$, where $\sigma_{X,Z}$ are Pauli matrices, defining unitary single qubit operations.

While the present invention is described above in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A quantum computation method, comprising:
   providing two or more tunnel coupled quantum dots, each containing one or two Fermions in a spin-up and/or spin-down state, wherein the Fermions are electrons;
   allowing resonant tunneling of the fermions between the quantum dots only when the Fermion spins are antiparallel, thereby converting spin parity information into charge information; and
   measuring the charge information via a projective measurement thereby determining the spin parity information, wherein measuring the charge information includes tunnel coupling a reference quantum dot to one of the one or more quantum dots, and adiabatically moving an electron to and from said one quantum dot to the reference quantum dot.

2. The method of claim 1, wherein measuring the charge information further includes making a quantum point contact (QPC) measurement.

3. The method of claim 1, including providing conditions for the resonant tunneling by applying an electric field to the quantum dots.

4. The method of claim 1, including forming the quantum dots in a two-dimensional electron gas layer of a semiconductor substrate.

5. The method of claim 4, including moving the electrons between quantum dots using an electric field created by electrodes incorporated into the semiconductor substrate.

6. The method of claim 1, including producing different Zeeman splittings between at least two of the quantum dots.

7. The method of claim 6, including providing the at least two quantum dots with different g-factors.

8. The method of claim 6, including subjecting the at least two quantum dots to different magnetic field strengths.

9. A method of quantum computing without two-qubit gates, comprising:
- forming two or more Fermionic qubits using corresponding two or more tunnel-coupled quantum that confine spin-½ Fermions, wherein the Fermions are electrons;
- making a spin parity measurement that includes allowing for resonant tunneling of the Fermions between quantum dots only for antiparallel spins;
- nondestructively converting Fermion spin parity information to charge information using a reference quantum dot; and
- measuring the charge information using a quantum point contact (QPC) measurement.

10. The method of claim 9, wherein at least two of the two or more quantum dots have different Zeeman splittings.

11. The method of claim 10, wherein the different Zeeman splittings are due to the at least two quantum dots having different g-factors.

12. The method of quantum computing by implementing a parity gate using two spin qubits as first and second input qubits, the method including:
- performing spin-to-charge conversion using a reference quantum dot;
- moving the input qubits into a Bell state analyzer using adiabatic charge transfer;
- allowing resonant tunneling of an electron into the reference quantum dot from one of the input qubits;
- extracting parity information of the first and second input qubits by making a charge measurement of the reference quantum dot using a quantum point contact current measurement; and
- adiabatically transferring the electron from the reference quantum dot to one of the input qubits.

13. The method of claim 12, wherein the first and second input qubits are formed from respective first and second quantum dots, and wherein the reference quantum dot has a Zeeman splitting different from that of the first and second input qubits.

* * * * *